US009047507B2

(12) United States Patent
Gurman et al.

(10) Patent No.: US 9,047,507 B2
(45) Date of Patent: Jun. 2, 2015

(54) UPPER-BODY SKELETON EXTRACTION FROM DEPTH MAPS (75) Inventors: Amiad Gurman, Elkana (IL); Oren Tropp, Kiryat Bialik (IL)

(73) Assignee: Apple Inc., Cupertino, CA (US)

(*) Notice: Subject to any disclaimer, the term of this patent is extended or adjusted under 35 U.S.C. 154(b) by 433 days.

(21) Appl. No.: 13/461,802

(22) Filed: May 2, 2012

(65) Prior Publication Data

US 2013/0293679 A1  Nov. 7, 2013

(51) Int. Cl.
*H04N 13/02* (2006.01)
*G06K 9/00* (2006.01)
*G06T 7/00* (2006.01)
*G06K 9/46* (2006.01)

(52) U.S. Cl.
CPC .......... *G06K 9/00362* (2013.01); *G06K 9/4638* (2013.01); *G06T 7/0042* (2013.01); *G06T 2207/10028* (2013.01); *G06T 2207/30196* (2013.01)

(58) Field of Classification Search
USPC .......................................................... 348/46
See application file for complete search history.

(56) References Cited

U.S. PATENT DOCUMENTS

| 5,684,887 | A | 11/1997 | Lee et al. |
| 5,846,134 | A | 12/1998 | Latypov |
| 5,852,672 | A | 12/1998 | Lu |
| 5,862,256 | A | 1/1999 | Zetts et al. |
| 5,864,635 | A | 1/1999 | Zetts et al. |
| 5,870,196 | A | 2/1999 | Lulli et al. |
| 6,002,808 | A | 12/1999 | Freeman |
| 6,176,782 | B1 | 1/2001 | Lyons et al. |
| 6,256,033 | B1 | 7/2001 | Nguyen |
| 6,658,136 | B1 | 12/2003 | Brumitt |
| 6,681,031 | B2 | 1/2004 | Cohen et al. |
| 6,771,818 | B1 | 8/2004 | Krumm et al. |
| 6,857,746 | B2 | 2/2005 | Dyner |
| 7,003,134 | B1 | 2/2006 | Covell et al. |
| 7,003,136 | B1 | 2/2006 | Harville |
| 7,013,046 | B2 | 3/2006 | Kawamura et al. |
| 7,042,440 | B2 | 5/2006 | Pryor et al. |
| 7,170,492 | B2 | 1/2007 | Bell |
| 7,215,815 | B2 | 5/2007 | Honda |
| 7,259,747 | B2 | 8/2007 | Bell |

(Continued)

FOREIGN PATENT DOCUMENTS

JP  H03-029806 A  2/1991
JP  H10-235584 A  9/1998

(Continued)

OTHER PUBLICATIONS

U.S. Appl. No. 13/867,083 Office Action dated Oct. 23, 2013.

(Continued)

*Primary Examiner* — Tracy Li
(74) *Attorney, Agent, or Firm* — D. Kligler I.P. Services Ltd.

(57) ABSTRACT

A method for processing data includes receiving a depth map of a scene containing at least an upper body of a humanoid form. The depth map is processed so as to identify a head and at least one arm of the humanoid form in the depth map. Based on the identified head and at least one arm, and without reference to a lower body of the humanoid form, an upper-body pose, including at least three-dimensional (3D) coordinates of shoulder joints of the humanoid form, is extracted from the depth map.

12 Claims, 5 Drawing Sheets

(56) References Cited

U.S. PATENT DOCUMENTS

| | | | |
|---|---|---|---|
| 7,302,099 B2 | 11/2007 | Zhang et al. | |
| 7,317,830 B1 | 1/2008 | Gordon et al. | |
| 7,340,077 B2 | 3/2008 | Gokturk | |
| 7,348,963 B2 | 3/2008 | Bell | |
| 7,428,542 B1 | 9/2008 | Fink et al. | |
| 7,536,032 B2 | 5/2009 | Bell | |
| 7,555,158 B2 | 6/2009 | Park et al. | |
| 7,580,572 B2 | 8/2009 | Bang et al. | |
| 7,583,275 B2 | 9/2009 | Neumann et al. | |
| 7,925,077 B2 | 4/2011 | Woodfill et al. | |
| 8,175,374 B2 | 5/2012 | Pinault et al. | |
| 8,249,334 B2 | 8/2012 | Berliner et al. | |
| 8,280,106 B2 | 10/2012 | Ma | |
| 8,320,621 B2 | 11/2012 | McEldowney | |
| 8,358,342 B2 | 1/2013 | Park | |
| 8,379,926 B2 | 2/2013 | Kanhere et al. | |
| 8,405,656 B2 | 3/2013 | El Dokor et al. | |
| 8,411,149 B2 | 4/2013 | Maison et al. | |
| 8,411,932 B2 | 4/2013 | Liu et al. | |
| 8,503,720 B2 | 8/2013 | Shotton et al. | |
| 2002/0071607 A1 | 6/2002 | Kawamura et al. | |
| 2003/0095698 A1 | 5/2003 | Kawano | |
| 2003/0113018 A1* | 6/2003 | Nefian et al. | 382/181 |
| 2003/0156756 A1 | 8/2003 | Gokturk et al. | |
| 2003/0235341 A1 | 12/2003 | Gokturk et al. | |
| 2004/0091153 A1 | 5/2004 | Nakano et al. | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0258306 A1 | 12/2004 | Hashimoto | |
| 2005/0031166 A1 | 2/2005 | Fujimura et al. | |
| 2005/0088407 A1 | 4/2005 | Bell et al. | |
| 2005/0089194 A1 | 4/2005 | Bell | |
| 2005/0265583 A1 | 12/2005 | Covell et al. | |
| 2005/0271279 A1 | 12/2005 | Fujimura et al. | |
| 2006/0092138 A1 | 5/2006 | Kim et al. | |
| 2006/0115155 A1 | 6/2006 | Lui et al. | |
| 2006/0159344 A1 | 7/2006 | Shao et al. | |
| 2007/0003141 A1 | 1/2007 | Rittscher et al. | |
| 2007/0076016 A1 | 4/2007 | Agarwala et al. | |
| 2007/0154116 A1 | 7/2007 | Shieh | |
| 2007/0230789 A1 | 10/2007 | Chang et al. | |
| 2008/0123940 A1 | 5/2008 | Kundu et al. | |
| 2008/0226172 A1 | 9/2008 | Connell | |
| 2008/0236902 A1 | 10/2008 | Imaizumi | |
| 2008/0252596 A1 | 10/2008 | Bell et al. | |
| 2008/0260250 A1 | 10/2008 | Vardi | |
| 2008/0267458 A1 | 10/2008 | Laganiere et al. | |
| 2008/0310706 A1 | 12/2008 | Asatani et al. | |
| 2009/0009593 A1 | 1/2009 | Cameron et al. | |
| 2009/0027335 A1 | 1/2009 | Ye | |
| 2009/0035695 A1* | 2/2009 | Campestrini et al. | 430/273.1 |
| 2009/0078473 A1 | 3/2009 | Overgard et al. | |
| 2009/0083622 A1 | 3/2009 | Chien et al. | |
| 2009/0096783 A1 | 4/2009 | Shpunt et al. | |
| 2009/0116728 A1 | 5/2009 | Agrawal et al. | |
| 2009/0183125 A1 | 7/2009 | Magal et al. | |
| 2009/0222388 A1 | 9/2009 | Hua et al. | |
| 2009/0297028 A1 | 12/2009 | De Haan | |
| 2010/0002936 A1 | 1/2010 | Khomo | |
| 2010/0007717 A1 | 1/2010 | Spektor et al. | |
| 2010/0034457 A1 | 2/2010 | Berliner et al. | |
| 2010/0111370 A1 | 5/2010 | Black et al. | |
| 2010/0235786 A1 | 9/2010 | Maizels et al. | |
| 2010/0302138 A1 | 12/2010 | Poot et al. | |
| 2010/0303289 A1 | 12/2010 | Polzin et al. | |
| 2010/0322516 A1 | 12/2010 | Xu et al. | |
| 2011/0025689 A1 | 2/2011 | Perez et al. | |
| 2011/0052006 A1 | 3/2011 | Gurman et al. | |
| 2011/0164032 A1 | 7/2011 | Shadmi et al. | |
| 2011/0182477 A1 | 7/2011 | Tamrakar et al. | |
| 2011/0211754 A1 | 9/2011 | Litvak et al. | |
| 2011/0237324 A1 | 9/2011 | Clavin et al. | |
| 2011/0292036 A1 | 12/2011 | Sali et al. | |
| 2011/0293137 A1* | 12/2011 | Gurman et al. | 382/103 |
| 2012/0070070 A1 | 3/2012 | Litvak | |
| 2012/0087572 A1* | 4/2012 | Dedeoglu et al. | 382/154 |
| 2012/0162065 A1* | 6/2012 | Tossell et al. | 345/156 |

FOREIGN PATENT DOCUMENTS

| | | | |
|---|---|---|---|
| WO | 9935633 | A2 | 7/1999 |
| WO | 03071410 | A2 | 8/2003 |
| WO | 2004107272 | A1 | 12/2004 |
| WO | 2005003948 | A1 | 1/2005 |
| WO | 2005094958 | A2 | 10/2005 |
| WO | 2007043036 | A1 | 4/2007 |
| WO | 2007078639 | A2 | 7/2007 |
| WO | 2007105205 | A2 | 9/2007 |
| WO | 2007132451 | A2 | 11/2007 |
| WO | 2007135376 | A2 | 11/2007 |
| WO | 2008120217 | A2 | 10/2008 |
| WO | 2010004542 | A1 | 1/2010 |

OTHER PUBLICATIONS

U.S. Appl. No. 13/867,085 Office Action dated Nov. 7, 2013.

Krumm et al., "Multi-camera multi person tracking for EasyLiving"., Visual surveillance, 2000, Proceedings, Third International workshop pp. 1-8, 2000.

Yous et al., "People detection and tracking with World-Z map from single stereo camera".,Visual surveillance, 2008, Eighth International workshop , pp. 1-8, 2008.

Damen et al., "Detecting carried objects in short video sequences", ECCV , School of computing, University of Leeds, pp. 1-14, 2008.

Ran et al., "Multi moving people detection from binocular sequences", Center for Automation Research Institute of Advanced Computer Studies, University of Maryland, pp. 1-4, 2003.

Balcells et al., "An appearance-based approach for consistent labeling of humans and objects in video", Pattern Analysis and Application, pp. 373-385, 2004.

Cucchiara et al., "Track-based and object-based occlusion for people tracking refinement indoor surveillance", VSSN, pp. 1-7, 2004.

Ess et al., "Improved multi- person tracking with active occlusion handling", ICRA workshop of people Detection and tracking, pp. 1-6, 2009.

Hart, D., U.S. Appl. No. 09/616,606, filed Jul. 14, 2000.

International Application PCT/IL2007/000306 Search Report dated Oct. 2, 2008.

Gesturetek Inc., Consumer Electronics Solutions, "Gesture Control Solutions for Consumer Devices", www.gesturetek.com, Toronto, Ontario, Canada, 2009.

International Application PCT/IL2006/000335 Preliminary Report on Patentability dated Apr. 24, 2008.

Avidan et al., "Trajectory triangulation: 3D reconstruction of moving points from amonocular image sequence", PAMI, vol. 22, No. 4, pp. 348-357, Apr. 2000.

Leclerc et al., "The direct computation of height from shading", IEEE Conference on Computer Vision and Pattern Recognition, pp. 552-558, Jun. 3-7, 1991.

Zhang et al., "Shape from intensity gradient", IEEE Transactions on Systems, Man, and Cybernetics—Part A: Systems and Humans, vol. 29, No. 3, pp. 318-325, May 1999.

Zhang et al., "Height recovery from intensity gradients", IEEE Conference on Computer Vision and Pattern Recognition, pp. 508-513, Jun. 20-24, 1994.

Horn, B., "Height and gradient from shading", International Journal of Computer Vision , vol. 5, No. 1, pp. 37-75, Aug. 1990.

Bruckstein, A., "On Shape from Shading", Computer Vision, Graphics, and Image Processing Journal, vol. 44, issue 2, pp. 139-154, Nov. 1988.

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jun. 19-21, 2002.

Besl, P., "Active Optical Range Imaging Sensors", Journal Machine Vision and Applications, vol. 1, issue 2, pp. 127-152, Apr. 1988.

(56) References Cited

OTHER PUBLICATIONS

Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence, vol. 10, No. 5, pp. 749-754, Sep. 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Kimmel et al., Analyzing and synthesizing images by evolving curves with the Osher-Sethian method, International Journal of Computer Vision, vol. 24, issue 1, pp. 37-55, Aug. 1997.
Zigelman et al., "Texture mapping using surface flattening via multidimensional scaling", IEEE Transactions on Visualization and Computer Graphics, vol. 8, issue 2, pp. 198-207, Apr.-Jun. 2002.
Dainty, J.C., "Introduction", Laser Speckle and Related Phenomena, pp. 1-7, Springer-Verlag, Berlin Heidelberg, 1975.
Mendlovic, et al., "Composite harmonic filters for scale, projection and shift invariant pattern recognition", Applied Optics Journal, vol. 34, No. 2, pp. 310-316, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, IPT 2004.
Howe et al., "Bayesian Reconstruction of 3D Human Motion from Single-Camera Video", Advances in Neural Information Processing Systems 12, Denver, USA, 1999.
U.S. Appl. No. 61/429,767, filed Jan. 5, 2011.
Grammalidis et al., "3-D Human Body Tracking from Depth Images Using Analysis by Synthesis", Proceedings of the IEEE International Conference on Image Processing (ICIP2001), pp. 185-188, Thessaloniki, Greece, Oct. 7-10, 2001.
International Application PCT/IL2007/000574 Search Report dated Sep. 10, 2008.
Softkinetic S.A., "3D Gesture Recognition Platform for Developers of 3D Applications", Product Datasheet, IISU™, www.softkinetic-optrima.com, Belgium, 2007-2010.
Li et al., "Real-Time 3D Motion Tracking with Known Geometric Models", Real-Time Imaging Journal, vol. 5, pp. 167-187, Academic Press 1999.
Segen et al., "Shadow gestures: 3D hand pose estimation using a single camera", Proceedings of IEEE International Conference on Computer Vision and Pattern Recognition, pp. 479-485, Fort Collins, USA, Jun. 23-25, 1999.
Vogler et al., "ASL recognition based on a coupling between HMMs and 3D motion analysis", Proceedings of IEEE International Conference on Computer Vision, pp. 363-369, Mumbai, India, Jan. 4-7, 1998.
Gionis et al., "Similarity Search in High Dimensions via Hashing", Proceedings of the 25th Very Large Database (VLDB) Conference, Edinburgh, UK, Sep. 7-10, 1999.
Bleiweiss et al., "Markerless Motion Capture Using a Single Depth Sensor", SIGGRAPH Asia 2009, Yokohama, Japan, Dec. 16-19, 2009.
Comaniciu et al., "Mean Shift: A Robust Approach Toward Feature Space Analysis", IEEE Transactions on Pattern Analysis and Machine Intelligence, vol. 24, No. 4, pp. 603-619, May 2002.
Datar et al., "Locality-Sensitive Hashing Scheme Based on p-Stable Distributions", Proceedings of the Symposium on Computational Geometry, pp. 253-262, Brooklyn, USA, Jun. 9-11, 2004.
Dekker, L., "Building Symbolic Information for 3D Human Body Modeling from Range Data", Proceedings of the Second International Conference on 3D Digital Imaging and Modeling, IEEE computer Society, pp. 388-397, Ottawa, Canada, Oct. 4-8, 1999.
Holte et al., "Gesture Recognition using a Range Camera", Technical Report, Laboratory of Computer Vision and Media Technology, Aalborg University, Denmark, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, Jun. 2007.
Nam et al., "Recognition of Hand Gestures with 3D, Nonlinear Arm Movements", Pattern Recognition Letters, vol. 18, No. 1, pp. 105-113, Elsevier Science B.V. 1997.
Segen et al., "Human-computer interaction using gesture recognition and 3D hand tracking", ICIP 98, Proceedings of the IEEE International Conference on Image Processing, vol. 3, pp. 188-192, Chicago, USA, Oct. 4-7, 1998.
Ascension Technology Corporation, "Flock of Birds: Real-Time Motion Tracking", 2008.
Nesbat, S., "A System for Fast, Full-Text Entry for Small Electronic Devices", Proceedings of the 5th International Conference on Multimodal Interfaces, ICMI 2003, Vancouver, Canada, Nov. 5-7, 2003.
Bleiweiss et al., "Fusing Time-of-Flight Depth and Color for Real-Time Segmentation and Tracking", Editors R. Koch and A. Kolb: Dyn3D 2009, LNCS 5742, pp. 58-69, Springer-Verlag Berlin Heidelberg 2009.
Chinese Patent Application # 200780013930 Official Action dated Nov. 17, 2011.
Japanese Patent Application # 2009508667 Official Action dated Nov. 24, 2011.
U.S. Appl. No. 13/229,727 Office Action dated Mar. 13, 2013.
U.S. Appl. No. 12/854,187 Office Action dated Apr. 19, 2013.
Grzeszczuk et al., "Stereo based gesture recognition invariant for 3D pose and lighting", Proceedings of IEEE Conference on Computer Vision and Pattern Recognition, vol. 1, pp. 826-833, Jun. 13-15, 2000.
Li et al., "Statistical modeling of complex backgrounds for foreground object detection", IEEE Transactions on Image Processing, vol. 13, No. 11, pp. 1459-1472, Nov. 2004.
Ren et al., "Real-time modeling of 3-D soccer ball trajectories from multiple fixed cameras", IEEE Transactions on Circuits and Systems for Video Technology, vol. 18, No. 3, pp. 350-362, Mar. 2008.
Gurman, A., U.S. Appl. No. 13/663,518, filed Oct. 30, 2012.
Litvak et al., U.S. Appl. No. 13/786,508, filed Mar. 6, 2013.
Maizels et al., U.S. Appl. No. 61/429,767, filed Jan. 5, 2011.
Primesense Inc., "Prime Sensor™ NITE 1.1 Framework Programmer's Guide", Version 1.2, 2009.
Luxand Inc., "Luxand FaceSDK 3.0 Face Detection and Recognition Library Developer's Guide", years 2005-2010.
Intel Corporation, "Open Source Computer Vision Library Reference Manual", years 1999-2001.
Arya et al., "An Optimal Algorithm for Approximate Nearest Neighbor Searching in Fixed Dimensions", Association for Computing Machinery Journal, vol. 45, issue 6, pp. 891-923, New York, USA, Nov. 1998.
Muja et al., "Fast Approximate Nearest Neighbors with Automatic Algorithm Configuration", International Conference on Computer Vision Theory and Applications, pp. 331-340, Lisboa, Portugal, Feb. 5-8, 2009.
Mori et al., "Estimating Human Body Configurations Using Shape Context Matching", Proceedings of the European Conference on Computer Vision, vol. 3, pp. 666-680, Copenhagen, Denmark, May 27-Jun. 2, 2002.
Agarwal et al., "Monocular Human Motion Capture with a Mixture of Regressors", Proceedings of the 2004 IEEE Conference on Computer Vision and Pattern Recognition, San Diego, USA, Jun. 20-26, 2005.
Lv et al., "Single View Human Action Recognition Using Key Pose Matching and Viterbi Path Searching", Proceedings of IEEE Conference on Computer Vision and Pattern Recognition, Minneapolis, USA, Jun. 17-22, 2007.

(56) References Cited

OTHER PUBLICATIONS

Munoz-Salinas et al., "People Detection and Tracking Using Stereo Vision and Color", Image and Vision Computing, vol. 25, No. 6, pp. 995-1007, Jun. 1, 2007.

Bradski, G., "Computer Vision Face Tracking for Use in a Perceptual User Interface", Intel Technology Journal, vol. 2, issue 2 (2nd Quarter 2008).

Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.

Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.

Shi et al., "Good Features to Track", IEEE Conference on Computer Vision and Pattern Recognition, pp. 593-600, Seattle, USA, Jun. 21-23, 1994.

Vosselman et al., "3D Building Model Reconstruction From Point Clouds and Ground Plans", International Archives of Photogrammetry and Remote Sensing, vol. XXXIV-3/W4, pp. 37-43, Annapolis, USA, Oct. 22-24, 2001.

Submuth et al., "Ridge Based Curve and Surface Reconstruction", Eurographics Symposium on Geometry Processing, Barcelona, Spain, Jul. 4-6, 2007.

Fergus et al., "Object Class Recognition by Unsupervised Scale-Invariant Learning", Proceedings of the IEEE Conference on Computer Vision and Pattern Recognition, vol. 2, pp. 264-271, Jun. 18-20, 2003.

Cohen et al., "Interference of Human Postures by Classification of 3D Human Body Shape", IEEE International Workshop on Analysis and Modeling of Faces and Gestures, ICCV 2003, Nice, France, Oct. 14-17, 2003.

Agarwal et al., "3D Human Pose from Silhouettes by Relevance Vector Regression", Proceedings of the IEEE Conference on Computer Vision and Pattern Recognition, vol. 2, pp. 882-888, Jun. 27-Jul. 2, 2004.

Borenstein et al., "Combining Top-down and Bottom-up Segmentation", Proceedings of the IEEE Conference on Computer Vision and Pattern Recognition, Jun. 27-Jul. 2, 2004.

Karlinsky et al., "Combined Model for Detecting, Localizing, Interpreting and Recognizing Faces", Faces in Real-Life Images workshop, European Conference on Computer Vision, France, Oct. 12-18, 2008.

Ullman, S., "Object Recognition and Segmentation by a Fragment-Based Hierarchy", Trends in Cognitive Sciences, vol. 11, No. 2, pp. 58-64, Feb. 2007.

Shakhnarovich et al., "Fast Pose Estimation with Parameter Sensitive Hashing", Proceedings of the 9th IEEE International Conference on Computer Vision (ICCV 2003), pp. 750-759, Nice, France, Oct. 14-17, 2003.

Ramanan et al., "Training Deformable Models for Localization", Proceedings of the 2006 IEEE Conference on Computer Vision and Pattern Recognition, pp. 206-213, New York, USA, Jun. 17-22, 2006.

Ramanan, D., "Learning to Parse Images of Articulated Bodies", Neural Information Processing Systems Foundation year 2006.

Jiang, H., "Human Pose Estimation Using Consistent Max-Covering", 12th IEEE International Conference on Computer Vision, Kyoto, Japan, Sep. 27-Oct. 4, 2009.

Shotton et al., "Real-Time Human Pose Recognition in Parts from Single Depth Images", 24th IEEE Conference on Computer Vision and Pattern Recognition, Colorado Springs, USA, Jun. 20-25, 2011.

Rodgers et al., "Object Pose Detection in Range Scan Data", IEEE Conference on Computer Vision and Pattern Recognition, pp. 2445-2452, New York, USA, Jun. 17-22, 2006.

U.S. Appl. No. 61/609,386, filed Mar. 12, 2012.

U.S. Appl. No. 12/300,086 Official Action dated Jan. 17, 2012.

U.S. Appl. No. 12/854,188 Official Action dated Nov. 26, 2012.

* cited by examiner

UPPER-BODY SKELETON EXTRACTION FROM DEPTH MAPS

FIELD OF THE INVENTION

The present invention relates generally to methods and systems for three-dimensional (3D) mapping, and specifically to processing of 3D map data.

BACKGROUND

A number of different methods and systems are known in the art for creating depth maps. In the present patent application and in the claims, the term "depth map" refers to a representation of a scene as a two-dimensional matrix of pixels, in which each pixel corresponds to a respective location in the scene and has a respective pixel depth value, indicative of the distance from a certain reference location to the respective scene location. In other words, the depth map has the form of an image in which the pixel values indicate topographical information, rather than brightness and/or color of the objects in the scene. Depth maps may be created, for example, by detection and processing of an image of an object onto which a speckle pattern is projected, as described in PCT International Publication WO 2007/043036 A1, whose disclosure is incorporated herein by reference. The terms "depth map" and "3D map" are used herein interchangeably and have the same meaning.

Depth maps may be processed in order to segment and identify objects in the scene. Identification of humanoid forms (meaning 3D shapes whose structure resembles that of a human being) in a depth map, and changes in these forms from scene to scene, may be used as a means for controlling computer applications. For example, PCT International Publication WO 2007/132451, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

As another example, U.S. Patent Application Publication 2011/0052006, whose disclosure is incorporated herein by reference, describes a method for processing a temporal sequence of depth maps of a scene containing a humanoid form. A digital processor processes at least one of the depth maps so as to find a location of the head of the humanoid form, and estimates dimensions of the humanoid form based on this location. The processor tracks movements of the humanoid form over the sequence using the estimated dimensions.

SUMMARY

Embodiments of the present invention provide methods, devices and software for extracting information from depth maps.

There is therefore provided, in accordance with an embodiment of the present invention, a method for processing data, which includes receiving a depth map of a scene containing at least an upper body of a humanoid form. The depth map includes a matrix of pixels having respective pixel depth values. Using a digital processor, the depth map is processed so as to identify a head and at least one arm of the humanoid form in the depth map. Based on the identified head and at least one arm, and without reference to a lower body of the humanoid form, an upper-body pose, including at least three-dimensional (3D) coordinates of shoulder joints of the humanoid form, is extracted from the depth map.

The upper-body pose may be found while the humanoid form in the depth map is seated, or standing In a disclosed embodiment, processing the depth map includes locating one or more ridges in the depth map corresponding to parts of the humanoid form, each ridge corresponding to a chain of the pixels whose respective depth values are local minima. Additionally or alternatively, processing the depth map includes locating depth edges in the depth map corresponding to parts of the humanoid form, and associating arcuate depth edges found in the depth map with the head and with a hand of the form. Further additionally or alternatively, extracting the upper-body pose includes finding 3D medial axes of the head and the at least one arm in the depth map, and finding the upper-body pose that includes estimated positions of the head and the at least one arm that satisfy constraints of a predefined body model while minimizing an error between the 3D medial axes and the estimated positions.

In some embodiments, the method includes controlling a computerized system responsively to the extracted upper-body pose.

There is also provided, in accordance with an embodiment of the present invention, a method for processing data, which includes receiving a depth map of a scene containing an object of interest. Using a digital processor, the depth map is processed so as to locate a single ridge on each limb of the object. The ridge corresponds to a chain of the pixels whose respective depth values are local minima. Features of the object are extracted from the depth map responsively to the ridge.

In a disclosed embodiment, processing the depth map includes finding each local minimum on a respective line oriented obliquely relative to the chain, while the respective depth values of the other pixels on the respective line are greater than the local minimum. Additionally or alternatively, extracting the features includes processing the depth map so as to locate one or more depth edges of the object, and applying the depth edges together with the ridge in order to reconstruct a three-dimensional shape of the object. Further additionally or alternatively, extracting the features includes partitioning the chain into segments, fitting a line to each segment, and finding a location and orientation of the object based on the line.

In one embodiment, the object is a head of a humanoid form, and extracting the features includes finding an increase in the respective depth values of the pixels at an upper end of the ridge, and identifying the object as the head responsively to the increase. Additionally or alternatively, identifying the object as the head includes processing the depth map so as to locate an arcuate depth edge around the upper end of the ridge.

There is additionally provided, in accordance with an embodiment of the present invention, apparatus for processing data, which includes an imaging assembly, which is configured to capture a depth map of a scene containing at least an upper body of a humanoid form. A processor is configured to process the depth map so as to identify a head and at least one arm of the humanoid form in the depth map, and to extract from the depth map, based on the identified head and at least one arm, and without reference to a lower body of the humanoid form, an upper-body pose including at least three-dimensional (3D) coordinates of shoulder joints of the humanoid form.

There is further provided, in accordance with an embodiment of the present invention, apparatus for processing data, which includes an imaging assembly, which is configured to capture a depth map of a scene containing an object of interest. A processor is configured to process the depth map so as to locate a single ridge on each limb of the object and to extract, responsively to the ridge, features of the object from the depth map.

There is moreover provided, in accordance with an embodiment of the present invention, a computer software product, including a computer-readable medium in which program instructions are stored, which instructions, when read by a computer, cause the computer to receive a depth map of a scene containing at least an upper body of a humanoid form, to process the depth map so as to identify a head and at least one arm of the humanoid form in the depth map, and to extract from the depth map, based on the identified head and at least one arm, and without reference to a lower body of the humanoid form, an upper-body pose including at least three-dimensional (3D) coordinates of shoulder joints of the humanoid form.

There is furthermore provided, in accordance with an embodiment of the present invention, a computer software product, including a computer-readable medium in which program instructions are stored, which instructions, when read by a computer, cause the computer to receive a depth map of a scene containing an object of interest, to process the depth map so as to locate a single ridge on each limb of the object, and to extract, responsively to the ridge, features of the object from the depth map.

The present invention will be more fully understood from the following detailed description of the embodiments thereof, taken together with the drawings in which:

DETAILED DESCRIPTION OF EMBODIMENTS

Overview

Depth maps contain a wealth of data, but extracting high-level information from depth maps is often difficult. Finding and tracking the pose of a humanoid form in a depth map, for example, requires that a digital processor separate the limbs and torso from the background and other objects in the depth map and correctly identify the positions and orientations of the limbs and torso. (The term "pose" is used in the context of the present description and in the claims to refer to a set of 3D coordinates, such as joint locations, that define the 3D positions and orientations of at least some of the limbs. The term "limbs" refers to the arms, legs, and head.) This task may become even more challenging when only a part of the humanoid form, such as the upper body, is captured in the depth map or when the humanoid form is seated or otherwise positioned directly against a background object.

Embodiments of the present invention that are described hereinbelow provide robust, efficient methods, systems and software for extracting humanoid forms from depth maps. These methods are directed particularly at extracting the pose of a 3D form that is believed to correspond to a humanoid body, and particularly the pose of the upper body. The parameters and changes of the pose can serve as a simplified input to application programs running on computerized systems, enabling such systems to respond to users' gestures. The capability of these embodiments to extract the upper-body pose without reference to the lower body of the humanoid form is particularly useful in remote control and other applications in which the user may be seated.

In the disclosed embodiments, a digital processor processes a depth map so as to identify the head and at least one arm of the humanoid form in the depth map. The processor applies this limb information is extracting an upper-body pose, which comprises the 3D coordinates of the shoulder joints of the humanoid form along with the head and arm positions. For this purpose, the processor typically finds 3D medial axes of the head and at least one arm in the depth map, and then finds the upper-body pose that minimizes the error between these 3D medial axes and the estimated positions of the head and arm (or arms) according to the pose, while satisfying the constraints of a predefined body model.

In some of the disclosed embodiments, the digital processor locates ridges in the depth map. Such ridges correspond to chains of pixels whose respective depth values are local minima, i.e., they are the closest points on an object (such as the limb of a humanoid form) to the sensor that is used to create the depth map. When an object of interest is in contact with a background object just behind it, depth edges (i.e., transitions in the depth coordinate between neighboring pixels) in the depth map may be faint and difficult to detect. Ridges, however, will nearly always be present and thus can be used, with or without depth edge information, in identifying object features, such as the head and arm of a person sitting against a chair back.

To identify the head of a person in a depth map, the processor may search for a ridge that runs vertically over the person's face. The pixels along the ridge will typically have roughly constant depth values over the range from the chin to the forehead, but the depth values will increase markedly at the upper end of the ridge, corresponding to the top of the head. The digital processor may identify the head by searching for a ridge with this sort of characteristic, possibly along with other factors, such as the size and shape of the object along which the ridge runs. For example, the processor may attempt to locate an arcuate depth edge around the upper end of the ridge, corresponding to the top of the head.

Although the disclosed embodiments use certain specific techniques for identification and pose estimation of the parts of the upper body of a humanoid form appearing in a depth map, the principles of the present invention may similarly be applied, mutatis mutandis, to extraction of other sorts of information from depth maps, regarding various sorts of objects. In particular, ridge detection may be used in various other applications of depth mapping and is not limited to skeleton extraction applications. Furthermore, the techniques described herein may be used in conjunction with other techniques that are known in the art for processing and extracting pose information from depth maps, such as the techniques described in the publications cited in the Background section above.

System Description

Figure 1:
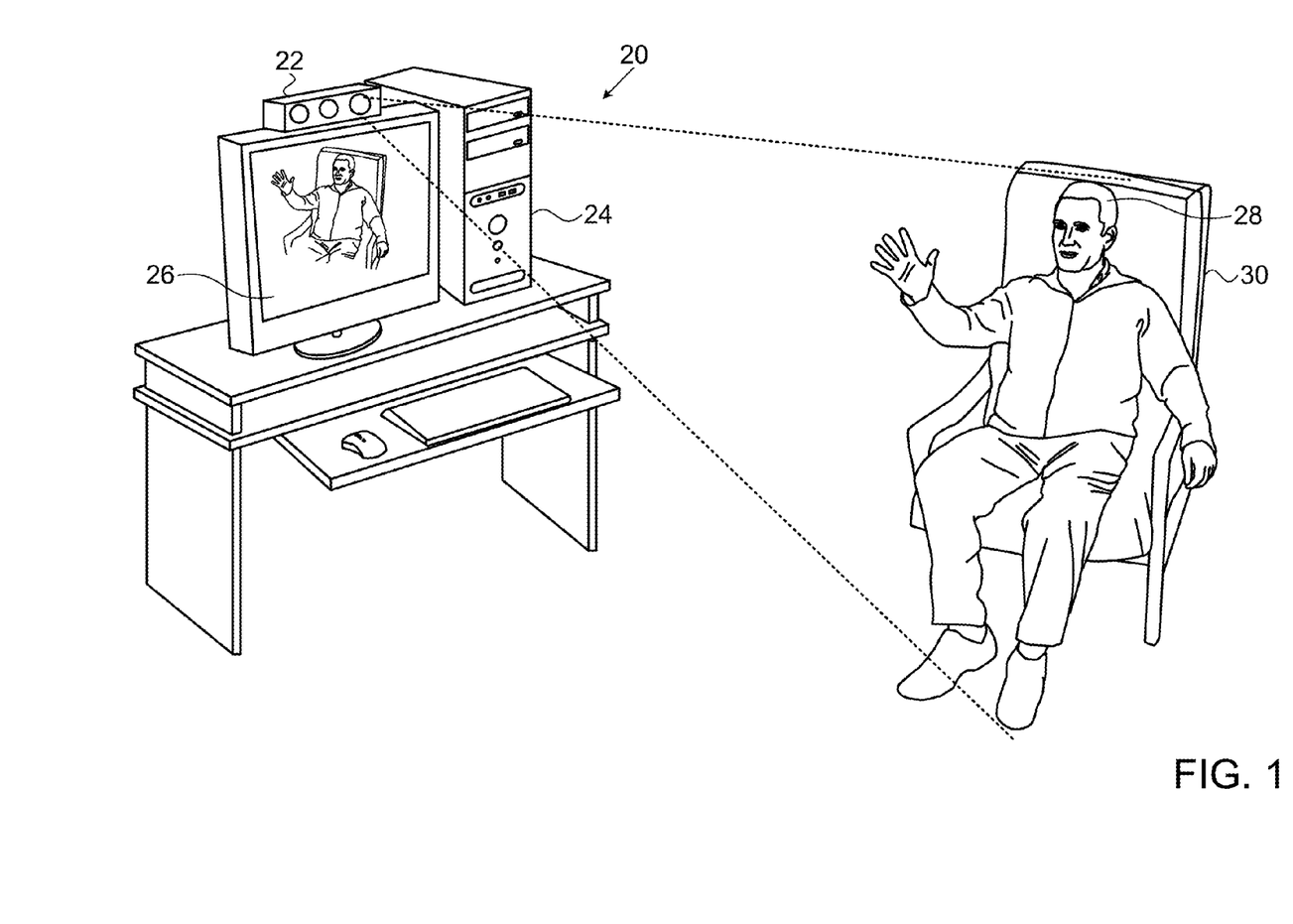
FIG. 1 is a schematic, pictorial illustration of a system for 3D mapping of humanoid forms, in accordance with an embodiment of the present invention.

FIG. 1 is a schematic, pictorial illustration of a 3D user interface system 20, in accordance with an embodiment of the present invention. The user interface is based on a 3D imaging assembly 22, which captures 3D scene information that includes at least a part of the body of a human user 28. The user in this example scenario is seated in a chair 30. Assembly 22 may also capture 2D color video images of the scene. Details of a 3D imaging assembly of this sort are described, for example, in PCT International Publication WO 2010/004542, whose disclosure is incorporated herein by reference.

Assembly 22 outputs a sequence of frames containing 3D map data (and possibly color image data, as well) to a computer 24, which extracts high-level information from the map data. This high-level information is provided via an Application Program Interface (API) to an application running on computer 24, which drives a display screen 26 accordingly. For example, user 28 may select and interact with content appearing on screen 26 by moving his arms.

In one embodiment, assembly 22 projects a pattern of spots onto the scene and captures an image of the projected pattern. Assembly 22 or computer 24 then computes the 3D coordinates of points in the scene (including points on the surface of the user's body) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in PCT International Publications WO 2007/043036, WO 2007/105205 and WO 2008/120217, whose disclosures are incorporated herein by reference, as well as in the above-mentioned WO 2010/004542.

Alternatively, system 20 may use other methods of 3D mapping, such as stereoscopic imaging or time-of-flight measurements, based on single or multiple cameras or other types of sensors, as are known in the art.

In the embodiment shown in FIG. 1, system 20 captures and processes a temporal sequence of depth maps (also referred to as 3D maps) containing user 28, while the user moves his body. Software running on a digital processor in assembly 22 and/or computer 24 processes the 3D map data to extract geometrical features of the humanoid form corresponding to user 28. The software analyzes these geometrical features (as described in detail hereinbelow) in order to extract an upper-body pose of the user, which typically includes 3D locations and orientations of the user's shoulders, arm joints and head. It may also analyze the trajectory of the hands over multiple frames in the sequence in order to identify gestures delineated by the hands. The skeleton and gesture information are provided via the above-mentioned API to an application program running on computer 24. This program may, for example, move and modify images presented on display 26 in response to the skeleton and/or gesture information.

Computer 24 typically comprises a general-purpose digital processor, which is programmed in software to carry out the functions described hereinbelow. The software may be downloaded to the processor in electronic form, over a network, for example, or it may alternatively be provided on tangible, non-transitory media, such as optical, magnetic, or electronic memory media. Alternatively or additionally, some or all of the described functions of the computer may be implemented in dedicated hardware, such as a custom or semi-custom integrated circuit or a programmable digital signal processor (DSP). Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly.

As another alternative, at least some of these processing functions may be carried out by a suitable digital processor that is integrated with display screen (in a television set, for example) or with any other suitable sort of computerized device, such as a game console or media player. The sensing functions of assembly 22 may likewise be integrated into the computer or other computerized apparatus that is to be controlled by the sensor output. References in the description and the claims to a "digital processor" should thus be understood as referring to any and all processing configurations that may be used in implementing the methods described herein.

Methods for Feature Extraction and Pose Estimation

Figure 2:
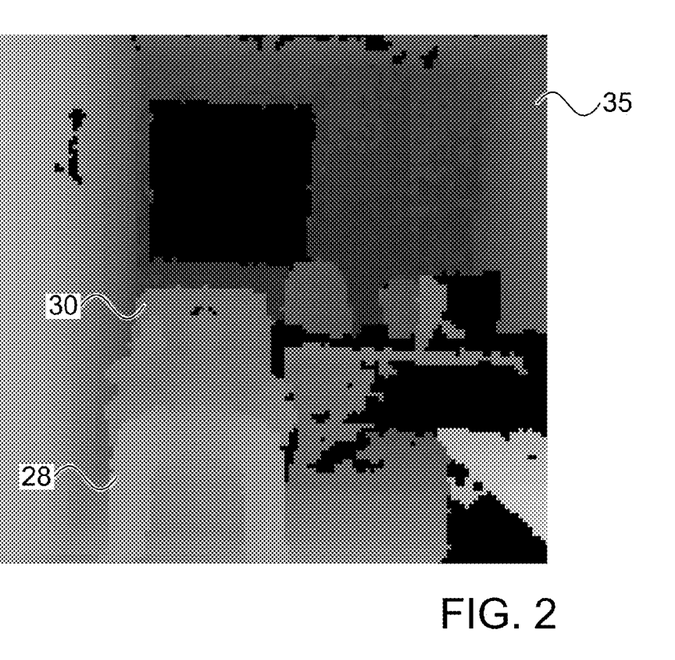
FIG. 2 is a schematic representation of a depth map, in accordance with an embodiment of the present invention.

FIG. 2 is a schematic representation of a depth map captured by assembly 22, in accordance with an embodiment of the present invention. The depth map, as explained above, comprises a matrix of pixels having respective depth values. The depth values are represented in FIG. 2 as gray-scale values, with lighter shades of gray corresponding to smaller depth values, i.e., locations closer to assembly 22. (Black areas correspond to pixels for which no depth values could be determined.) In this particular scene, the depth values of user 28 blend into those of chair 30 on which the user is sitting.

Figure 3:
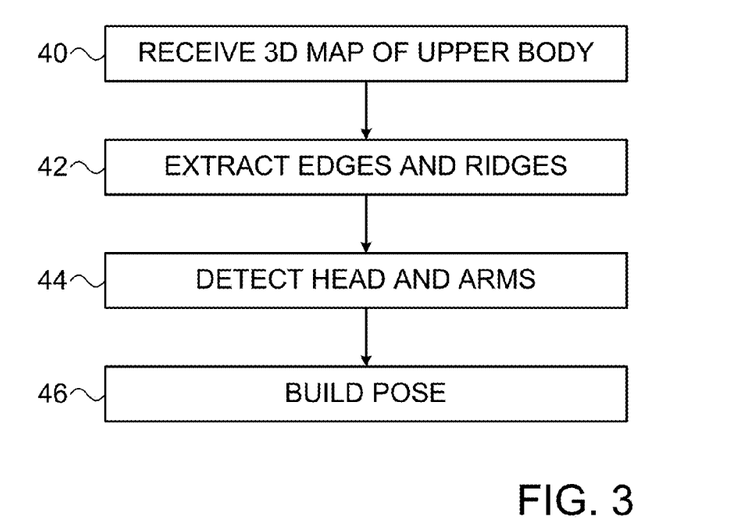
FIG. 3 is a flow chart that schematically illustrates a method for extracting an upper-body skeleton of a humanoid form from a depth map, in accordance with an embodiment of the present invention.

FIG. 3 is a flow chart that schematically illustrates a method for extracting an upper-body skeleton of a humanoid form from a depth map, in accordance with an embodiment of the present invention. Computer 24 applies this method upon receiving a depth map, such as map 35, at a map input step 40. Computer 24 processes the depth values in map 35 in order to identify and segment components of the image (i.e., groups of neighboring pixels) having characteristics of a humanoid form (such as overall size, shape, and motion from frame to frame of the sequence of depth maps). Methods for identification and segmentation of such forms in depth maps are described, for example, in U.S. Patent Application Publication 2011/0293137, whose disclosure is incorporated herein by reference.

Computer 24 processes the segmented forms in the depth map in order to find depth edges and ridges, at an edge and ridge extraction step 42. Various methods of edge extraction that are known in the art may be used at this step. For example, the computer may take a derivative of the depth map and then connect together neighboring pixels having similar derivative values until a complete edge has been defined. The above-mentioned WO 2007/132451 and US 2011/0052006 also describe methods that may be used for finding and processing depth edges.

Figure 4:
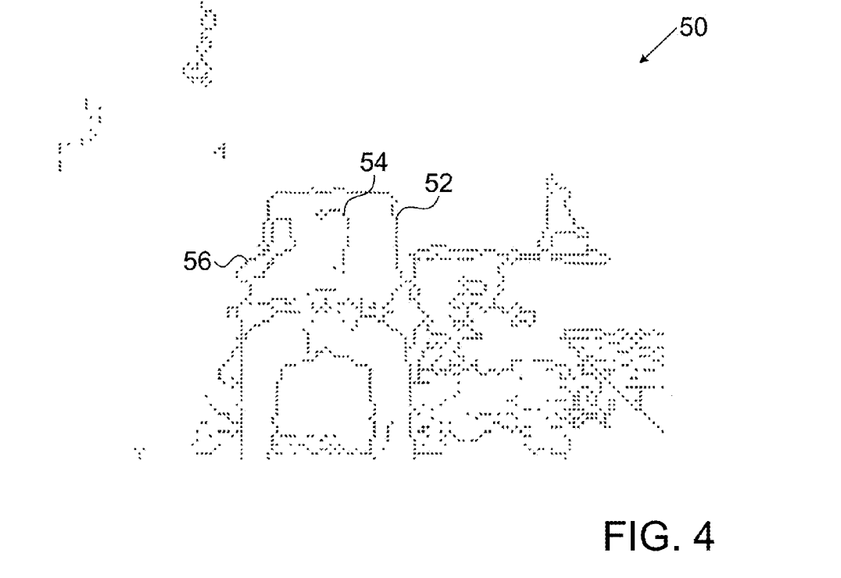
FIG. 4 is a schematic representation of depth edges extracted from the depth map of FIG. 2, in accordance with an embodiment of the present invention.

FIG. 4 is a schematic representation of an edge map 50, containing depth edges extracted from depth map 35 (FIG. 2), in accordance with an embodiment of the present invention. Edge pixels are marked by dots in the figure. An edge 52 of chair 30 is clearly visible. Edges 54 and 56, corresponding to the user's head and arm, however, are only partly defined due to the proximity (in terms of depth coordinates) of the user's upper body to the chair behind it.

Figure 5:
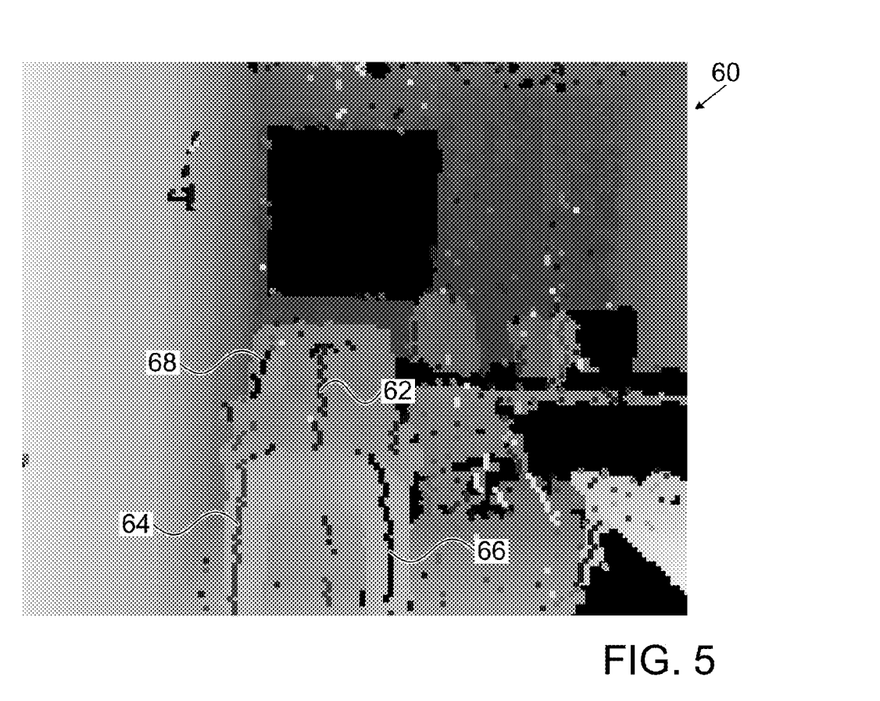
FIG. 5 is a schematic representation of ridges found in the depth map of FIG. 2, in accordance with an embodiment of the present invention.

FIG. 5 is a schematic representation of a ridge map 60, showing ridges found in depth map 35, in accordance with an embodiment of the present invention. A ridge 62 corresponds roughly to the center line of the user's head, continuing down to the upper part of the user's torso. Ridges 64 and 66 run along the user's legs, while a ridge 68 runs along the user's right arm.

Ridges, as noted earlier, are chains of pixels whose respective depth values correspond to local minima (although the chain may not run precisely through all the actual local minima in its vicinity, as explained below). A "chain," in the context of the present description and in the claims, refers to a series of neighboring pixels arranged consecutively along a line or curve. The term "neighboring" may include near neighbors, which are not directly adjacent (since noise and artifacts may affect some of the pixels along the chain). Each local minimum along the chain is the minimal depth value on a respective line that crosses the chain at an oblique angle (i.e., not parallel to the chain), while the respective depth values of the other pixels on the line to either side of the local minimum are greater than this minimal value.

Various algorithms may be applied by computer 24 in order to find ridges in map 35. One possible method is as follows:
1. Search the area of interest in the depth map for a pixel with a minimal depth value located between neighboring pixels with greater depth values.
2. Search along a line (roughly perpendicular to the chain, once a chain has been started) on opposite sides of the pixel having the minimal depth value until the extreme pixels of the ridge are found on both sides, defined as the pair of pixels along the line having depth values greater than the minimal value by a predefined threshold.
3. Take the center point between these extreme pixels on the opposite sides of the line as the ridge point. (This center point may not necessarily coincide exactly with the local minimum, but the inventor has found this definition of the ridge points to give more reliable results.)
4. Continue through steps 1-3 for the next point along the chain until done.

The above algorithm is built in such a way that the support pixels, i.e., pixels on the lines between the pairs of extreme pixels are mutually exclusive between any two ridges (no overlap). There could be, for example, two or more different local minima with the same extreme pixels, but they will be represented by only one middle pixel, as described above. The algorithm thus typically finds a single ridge on each limb of the body in the 3D map.

Computer 24 partitions the ridge and edge chains into straight segments and fits lines to these segments. This partitioning can be carried out recursively over the chains, using polygon simplification algorithms, for example, as are known in the art. Finding the chains as a preliminary step makes it possible to carry out this process efficiently. (Otherwise, it would be necessary to use complicated outlier rejection algorithms in the fitting process.)

Returning now to FIG. 3, computer 24 applies the ridges and edges found in depth map 35 in detecting the user's head and one or both arms, at a limb detection step 44. A number of different techniques may be combined at this step, some of which are described below. These techniques may be combined, as well, with other edge-based detection methods, such as those described in the above-mentioned US 2011/0052006. In addition, when computer 24 receives a sequence of depth maps, the pose and locations of limbs that were found in previous frames can be tracked in order to predict the locations of the limbs in the current frame, and thus focus and narrow the search for the head and arms. This sort of tracking, however, is beyond the scope of the present patent application.

Figure 6A:
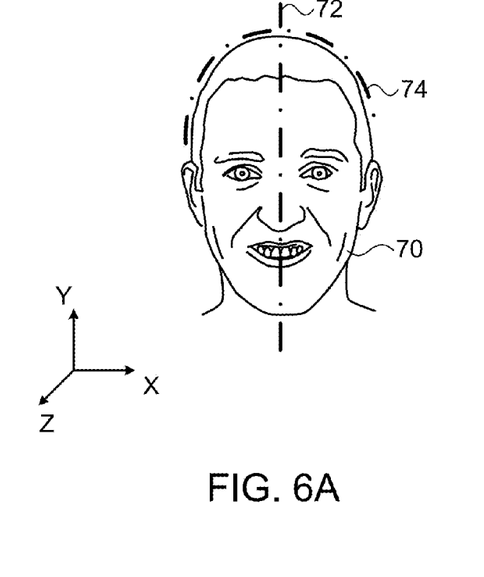
FIGS. 6A and 6B are frontal and side views, respectively, of a human head, illustrating a method for detecting the head in a depth map in accordance with an embodiment of the present invention.
Figure 6B:
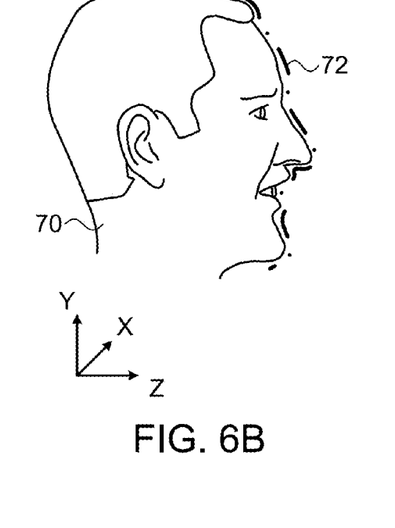

FIGS. 6A and 6B are frontal and side views, respectively, of a head 70 of a human subject, illustrating a method of detecting the head in a depth map in accordance with an embodiment of the present invention. This method may be applied by computer 24 at step 44. The X-Y plane in these figures is parallel to the pixel plane of the depth map, while the Z-axis corresponds to the depth.

A ridge 72 runs along the front of head 70. The depth values along the ridge are roughly constant from the chin up to the forehead. Above the forehead, however, the depth values of the pixels at the upper end of ridge 72 rapidly increase, and the ridge then disappears (as illustrated by ridge 62 in FIG. 5). This sort of ridge structure is characteristic of the head and is therefore applied by computer 24 as an indicator of head location and orientation.

Another indicator of head location is an arcuate edge 74 extending around the top of head 70. Computer 24 may fit an arc to appropriate edges in depth map 35, and may then calculate the quality of the fit as a measure of likelihood that the object in question is a head. Edge 54 in FIG. 4 illustrates the sort of arcuate shape that can be used in detecting head location. (The upper end of edge 56, corresponding to the user's hand, shows that arc fitting can also be used as a hand detector.)

Other factors may also be used in finding and verifying the head location. For example, computer 24 may find the sides of the head by searching along lines in the depth map that are perpendicular to ridge 72 until it finds pixels on both sides of the ridge having depth values greater than those of the corresponding ridge pixel by roughly half the expected depth of the head (typically by about 9 cm). The computer may then draw a curve through these pixels and may check whether the curve has an appropriate shape and size to be a head. Additionally or alternatively, the computer may take pixels spanning the surface of the head to either side of ridge 72 and may verify that they form a 3D ellipsoidal shape appropriate for a head. Similar sorts of criteria may be applied, mutatis mutandis, in finding and verifying the locations of the user's arms in the depth map.

Figure 7:
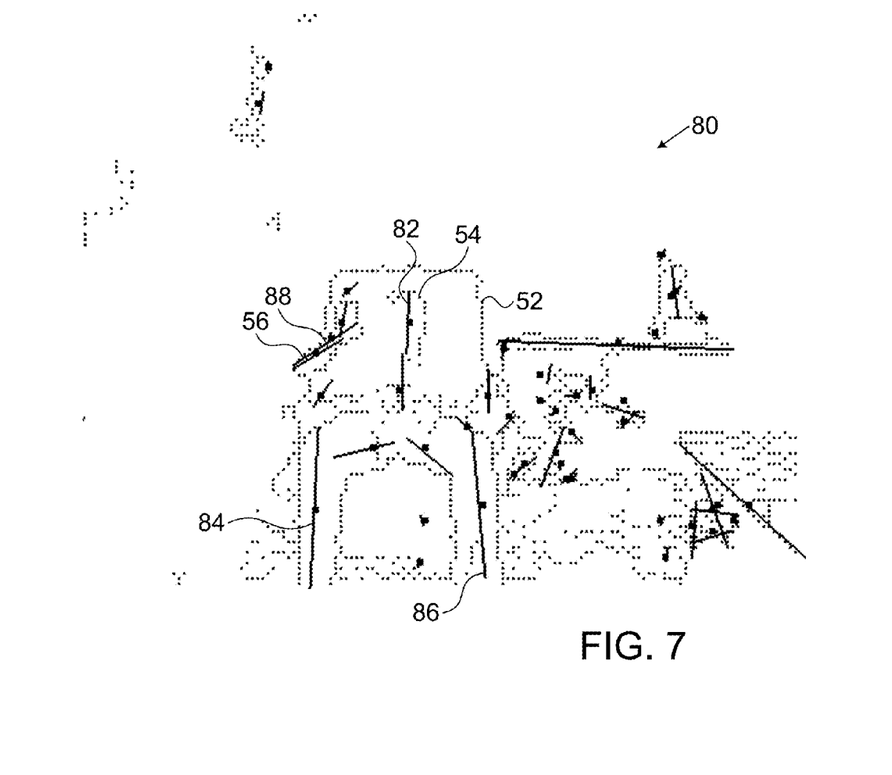
FIG. 7 is a schematic representation of a combination of ridges and edges defining a humanoid form in the depth map of FIG. 2, in accordance with an embodiment of the present invention.

FIG. 7 is a schematic representation of a combination of ridges and edges defining a humanoid form in depth map 35, in accordance with an embodiment of the present invention. Edges 52, 54, 56 are the same as those shown in FIG. 4. Ridges 62, 64, 66, 68 from FIG. 5 have been fitted with corresponding lines 82, 84, 86, 88. The ridge points may be grouped for fitting in such a way that the lines that are fitted to neighboring groups of ridge points meet at sharp angles, which typically correspond to joint angles. (Other ridges, belonging to background objects, are also fitted with lines in FIG. 7, but these lines are eliminated from consideration by computer 24 due to geometrical and other factors.) Edges 52, 54, 56 may also be fitted with lines, as described, for example, in the above-mentioned US 2011/0052006, but these lines are omitted from FIG. 7 for the sake of simplicity.

The location of the user's head and right arm can be seen in FIG. 7 based on the presence of ridge lines 82 and 88 and edges 54 and 56, respectively. The head is bounded by arcuate edge 54 around the upper end of ridge line 82, which is roughly indicative of the 3D medial axis of the head. The computer uses line 88, together with edge 56 to either side of this line, to find the 3D medial axis of the user's arm.

Referring back to FIG. 3 again, computer 24 estimates the upper-body pose of the user, at a pose-building step 46. For this purpose, the computer takes the medial axes of the head and the arm that were found at step 44, and attempts to find a pose that will satisfy the constraints of a predefined body model while minimizing the error between the 3D medial axes and the estimated positions of the head and arm according to the pose. This step does not assume any knowledge of the lower body and can be carried out based on head and arm positions alone. The body model assumes only that the head is located above and between the shoulder joints and that the arms comprise hands, forearms, and upper arms, attached at appropriate joints with ranges of motion that are anatomically reasonable.

Figure 8:
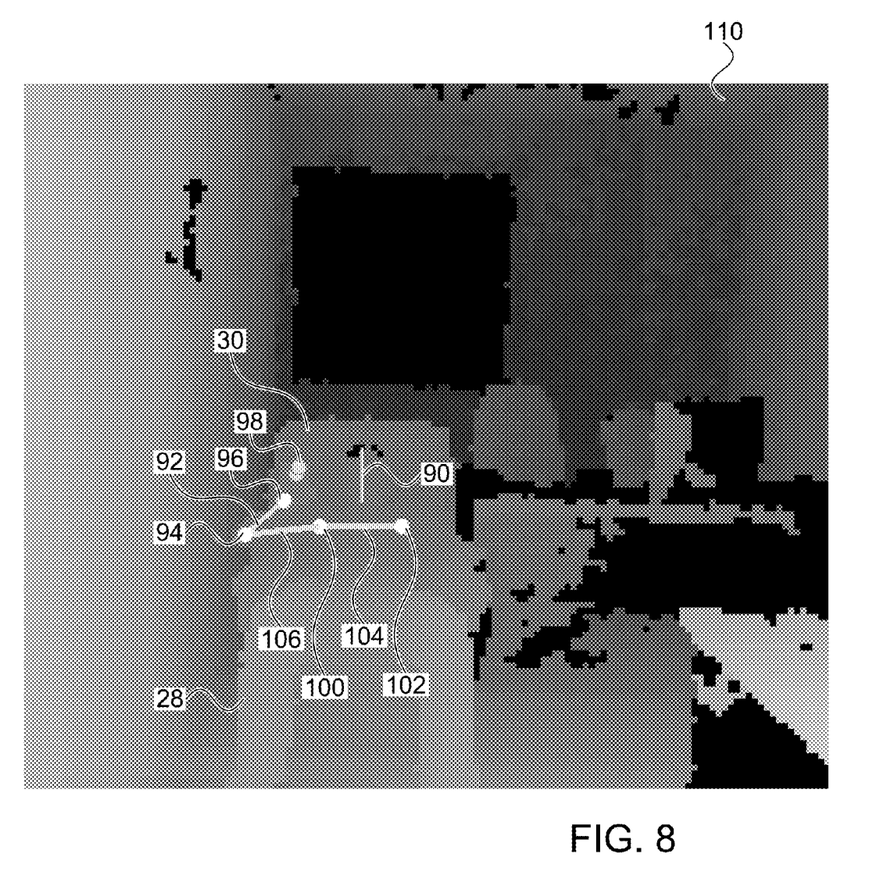
FIG. 8 is a schematic representation of an upper-body skeleton of a humanoid form extracted from the depth map of FIG. 2, in accordance with an embodiment of the present invention.

FIG. 8 is a schematic representation of an upper-body skeleton of user 28 that has been extracted from depth map 35, in accordance with an embodiment of the present invention. The skeleton comprises a set of segments connected by joints, which correspond roughly to bones and joints in the user's body. Although the skeleton is shown as a 2D construct due to limitations of the printed page, the components of the skeleton that are shown in the figure are characterized in practice by 3D coordinates. The user's head is represented by a head segment 90, indicating the location and orientation of the head. Fitting of the body model at step 46 has caused line 88 and edge 56 (FIG. 7) to be associated with a right forearm segment 92, between an elbow 94 and a wrist 96, which connects to a hand 98. The upper body itself is marked by shoulder joints 100 and 102, connected by a body segment 104. The body model yields a right upper arm segment 106 connecting joints 94 and 100. The 3D locations of joints 94, 96, 100 and 102 (possibly supplemented by the location of hand 98) define the upper-body pose. If the computer had been able to identify the user's left arm, the upper-body skeleton would include both arms, but a single arm is sufficient for pose definition in this model.

To locate shoulder joints 100 and 102, computer 24 takes as initial inputs the location of head segment 90 and elbow joint 94, as determined at step 44 and described above. The computer may also extract the slope dZ/dX of the frontal plane of the user's chest from the depth values in depth map 35. Based on these inputs, the computer finds the pose in terms of the center point (X,Y,Z coordinates) of the chest between the shoulders; the slope dY/dX between the shoulders; and a body size parameter. As explained earlier, the computer finds the parameters corresponding to the pose that minimizes the error relative to the arm and head locations that were found at step 44. Multiple different poses may be tested in this fashion until the optimal upper-body pose is found.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
    receiving a depth map of a scene containing an object of interest, the depth map comprising a matrix of pixels having respective pixel depth values;
    using a digital processor, processing the depth map so as to locate a single ridge on each limb of the object, the ridge corresponding to a chain of the pixels whose respective depth values are local minima; and
    responsively to the ridge, extracting features of the object from the depth map,
    wherein the object is a head of a humanoid form, and wherein extracting the features comprises finding an increase in the respective depth values of the pixels at an upper end of the ridge, and identifying the object as the head responsively to the increase, and
    wherein identifying the object as the head comprises processing the depth map so as to locate an arcuate depth edge around the upper end of the ridge.

2. The method according to claim 1, wherein processing the depth map comprises finding each local minimum on a respective line oriented obliquely relative to the chain, while the respective depth values of the other pixels on the respective line are greater than the local minimum.

3. The method according to claim 1, wherein extracting the features comprises processing the depth map so as to locate one or more depth edges of the object, and applying the depth edges together with the ridge in order to reconstruct a three-dimensional shape of the object.

4. The method according to claim 1, wherein extracting the features comprises partitioning the chain into segments, fitting a line to each segment, and finding a location and orientation of the object based on the line.

5. Apparatus for processing data, comprising:
    an imaging assembly, which is configured to capture a depth map of a scene containing an object of interest, the depth map comprising a matrix of pixels having respective pixel depth values; and
    a processor, which is configured to process the depth map so as to locate a single ridge on each limb of the object, the ridge corresponding to a chain of the pixels whose respective depth values are local minima, and to extract, responsively to the ridge, features of the object from the depth map,
    wherein the object is a head of a humanoid form, and wherein the processor is configured to find an increase in the respective depth values of the pixels at an upper end of the ridge, and to identify the object as the head responsively to the increase, and
    wherein the processor is configured to process the depth map so as to locate an arcuate depth edge around the upper end of the ridge, and to identify the object as the head responsively to the arcuate depth edge.

6. The apparatus according to claim 5, wherein the processor is configured to find each local minimum on a respective line oriented obliquely relative to the chain, while the respective depth values of the other pixels on the respective line are greater than the local minimum.

7. The apparatus according to claim 5, wherein the processor is configured to locate one or more depth edges of the object in the depth map, and to apply the depth edges together with the ridge in order to reconstruct a three-dimensional shape of the object.

8. The apparatus according to claim 5, wherein the processor is configured to partition the chain into segments, to fit a line to each segment, and to find a location and orientation of the object based on the line.

9. A computer software product, comprising a non-transitory computer-readable medium in which program instructions are stored, which instructions, when read by a computer, cause the computer to receive a depth map of a scene containing an object of interest, the depth map comprising a matrix of pixels having respective pixel depth values, to process the depth map so as to locate a single ridge on each limb of the object, the ridge corresponding to a chain of the pixels whose respective depth values are local minima, and to extract, responsively to the ridge, features of the object from the depth map, wherein the object is a head of a humanoid form, and wherein the instructions cause the computer to find an increase in the respective depth values of the pixels at an upper end of the ridge, and to identify the object as the head responsively to the increase, and wherein the instructions cause the computer to process the depth map so as to locate an arcuate depth edge around the upper end of the ridge, and to identify the object as the head responsively to the arcuate depth edge.

10. The product according to claim 9, wherein the instructions cause the computer to find each local minimum on a respective line oriented obliquely relative to the chain, while the respective depth values of the other pixels on the respective line are greater than the local minimum.

11. The product according to claim 9, wherein the instructions cause the computer to locate one or more depth edges of the object in the depth map, and to apply the depth edges together with the ridge in order to reconstruct a three-dimensional shape of the object.

12. The product according to claim 9, wherein the instructions cause the computer to partition the chain into segments, to fit a line to each segment, and to find a location and orientation of the object based on the line.

\* \* \* \* \*